(12) United States Patent
Spagnuolo Sobrinho et al.

(10) Patent No.: US 12,117,587 B2
(45) Date of Patent: Oct. 15, 2024

(54) PERSONALIZED WEATHER FORECAST

(71) Applicant: THE WEATHER COMPANY, LLC, Brookhaven, GA (US)

(72) Inventors: Jose Luis Spagnuolo Sobrinho, Alpharetta, GA (US); Joseph Michael Ziskovsky, Cottage Grove, MN (US); Alecio Pedro Delazari Binotto, Munich (DE); Lisa Seacat DeLuca, Bozeman, MT (US)

(73) Assignee: The Weather Company, LLC, Brookhaven, GA (US)

( * ) Notice: Subject to any disclaimer, the term of this patent is extended or adjusted under 35 U.S.C. 154(b) by 0 days.

(21) Appl. No.: 17/302,553

(22) Filed: May 6, 2021

(65) Prior Publication Data
US 2022/0357480 A1    Nov. 10, 2022

(51) Int. Cl.
*G01W 1/10* (2006.01)
*G01W 1/06* (2006.01)

(52) U.S. Cl.
CPC ............... *G01W 1/10* (2013.01); *G01W 1/06* (2013.01); *G01W 2203/00* (2013.01)

(58) Field of Classification Search
CPC ...... G01W 1/10; G01W 1/06; G01W 2203/00
See application file for complete search history.

(56) References Cited

U.S. PATENT DOCUMENTS

| | | | |
|---|---|---|---|
| 7,058,510 B2 | 6/2006 | Kelly | |
| 7,421,344 B1 | 9/2008 | Marsh | |
| 10,330,826 B2 | 6/2019 | Smyth | |
| 2010/0238179 A1 | 9/2010 | Kelly | |
| 2012/0259470 A1 | 10/2012 | Nijhawan | |
| 2014/0099614 A1* | 4/2014 | Hu | G09B 19/00 434/236 |
| 2017/0131435 A1 | 5/2017 | Peacock | |
| 2017/0249056 A1 | 8/2017 | Rainey | |
| 2017/0268793 A1 | 9/2017 | Cardonha | |
| 2018/0313975 A1 | 11/2018 | Chen | |
| 2018/0364394 A1 | 12/2018 | Phillips | |
| 2018/0372914 A1 | 12/2018 | Yan | |

(Continued)

FOREIGN PATENT DOCUMENTS

CN         105530305 A   *  4/2016
WO    WO-2016151494 A1  *  9/2016

OTHER PUBLICATIONS

It's The Weather (It's The Weather—Health Forecasts by Machine Learning, The Wayback Machine—https://web.archive.org/web/20160823235853/http://www.itstheweather.org:80/, Feb. 27, 2020) (Year: 2020).*

(Continued)

*Primary Examiner* — Daniel R Miller
*Assistant Examiner* — Christian T Bryant
(74) *Attorney, Agent, or Firm* — Barnes & Thornburg LLP

(57) ABSTRACT

The exemplary embodiments disclose a method, a computer program product, and a computer system for determining a personalized weather forecast. The exemplary embodiments may include collecting data of a user and weather conditions of a location, extracting one or more features from the collected data, and determining a personalized weather forecast of the location for the user based on the extracted one or more features and one or more models.

20 Claims, 7 Drawing Sheets

(56) References Cited

U.S. PATENT DOCUMENTS

2020/0166670 A1    5/2020  Zass
2022/0051765 A1*   2/2022  Wang ..................... G01K 13/20

OTHER PUBLICATIONS

AccuWeather (AccuWeather.com Debuts Health Forecasts in Every Local Weather Forecast, AccuWeather, Dec. 10, 2012, https://www.accuweather.com/en/press/2583736) (Year: 2012).*

Anonymous, "Cognitive Smart Farmer Assist System (System or Method to Provide Personalized and Customized Menu Driven Advisory System To Farmers)", IPCOM000258317D, April, 2019, pp. 1-6.

Anonymous, "Method to Capture Non-Interactive Consumer Feedback", IPCOM000263053D; Jul. 27, 2020, pp. 1-5.

Anonymously; "A Method and System for Generating a Customized Weather Alert", IPCOM000245105D, Feb. 8, 2016, pp. 1-4.

IBM Corporation; "Measurement, Modeling & Control Platforms Will Drive Smarter Energy Systems Through the Broad Implementation of Feedback Control", dgil@us.ibm.com, 2010, pp. 1-19.

Ifls, "Why Do Some People Feel the Cold More Than Others?", https://www.iflscience.com/health-and-medicine/why-do-some-people-fe . . . , printed Feb. 2, 2021, pp. 1-6.

Mell et al., "The NIST Definition of Cloud Computing", National Institute of Standards and Technology, Special Publication 800-145, Sep. 2011, pp. 1-7.

Treinish et al.; "The Potential Role for Cloud-Scale Numerical Weather Prediction for Terminal Area Planning and Scheduling", Econadapt/Library, https://econadapt-library.eu/node/1574, pp. 1-12.

Treinish, "Customized Visualizations of NWP-Based Forecasts for Decision Support in Emergency Management", http://www.research.ibm.com/weather/DT.html, May 12, 2001, pp. 1-45.

Treinish, L.; "A User-Driven Meso-Y-Scale Numerical Modeling and Visualization System for Weather-Sensitive Decision Making", http://www.research.ibm.com/weather/DT.html, May 12, 2001, pp. 1-40.

USPTO, "PreGrant Publication Database Search Results: Weather Presentation", http://appft1.uspto.gov/netacgi/nph-Parser?Sect1=PTO2&Sect2=HITO . . . , printed Feb. 2, 2021, pp. 1-2.

* cited by examiner

Hourly Weather – Bozeman, MT as of 12:00 pm MDT

Friday, August 28

⦿ Fire Weather Watch ›

| 12 pm | 70° | ☀ Sunny | | 0% | ⇜ NE 2 mph | ∧ |

| | Feels Like | Wind | Humidity | UV Index |
|---|---|---|---|---|
| | 70° | NE 2 mph | 42% | 5 of 10 |

| 1 pm | 73° | ☀ Sunny | | 0% | ⇜ NNE 1 mph | ∨ |
| 2 pm | 75° | ☀ Sunny | | 0% | ⇜ N 3 mph | ∨ |
| 3 pm | 78° | ☀ Sunny | | 0% | ⇜ N 4 mph | ∨ |
| 4 pm | 79° | ☀ Sunny | | 0% | ⇜ N 5 mph | ∨ |
| 5 pm | 80° | ☀ Sunny | | 0% | ⇜ NNE 5 mph | ∨ |

FIG. 3

PERSONALIZED WEATHER FORECAST

BACKGROUND

The exemplary embodiments relate generally to forecasting weather, and more particularly to personalizing a weather forecast for a user.

Many people perceive weather conditions differently. One person may view a temperature of 50 degrees Fahrenheit as warm while another person may view it as cold. Weather forecasts that are not personalized may fail to communicate weather considerations that may be important to a particular person. For example, if a person has asthma, they may be more sensitive to dust and smoke, and wish to be notified when weather conditions are not suitable for them.

U.S. Publ. Appln. No. 2018/0372914 describes a conventional approach wherein a weather forecast model is used to obtain high frequency future weather forecast data for a plurality of locations. However, this conventional approach does not provide a weather forecast unique to a recipient of the forecast.

U.S. Publ. Appln. No. 2018/0364934 describes a conventional approach wherein weather is forecasted based on mobile sensor data and satellite weather data. However, this conventional approach does not provide a weather forecast unique to a recipient of the forecast.

U.S. Publ. Appln. No. 2018/0313975 describes a conventional approach wherein a weather forecast product assists operation managers with operational decision-making related to a designated event. However, this conventional approach simply provides a weather forecast for an event and does not provide a weather forecast unique to a recipient of the forecast.

U.S. Publ. Appln. No. 2017/0131435 describes a conventional approach wherein a weather forecast prediction is made for a location of interest based on multiple sources of weather observation variables and multiple sources of weather forecast variables. However, this conventional approach simply provides a weather forecast for a location of interest and does not provide a weather forecast unique to a recipient of the forecast.

These conventional approaches only predict weather generally at best, as they do not determine a weather forecast unique to a recipient.

SUMMARY

The exemplary embodiments disclose a method, a computer program product, and a computer system for determining a personalized weather forecast. The exemplary embodiments may include collecting data of a user and weather conditions of a location, extracting one or more features from the collected data, and determining a personalized weather forecast of the location for the user based on the extracted one or more features and one or more models.

In a preferred embodiment, the user is notified of the personalized weather forecast for the user.

In a preferred embodiment, feedback indicative of whether the personalized weather forecast is helpful is received from the user and the one or more models are adjusted based on the received feedback.

In a preferred embodiment, training data is collected, training features are extracted from the training data, and one or more models are trained based on the extracted training features.

In a preferred embodiment, the one or more models correlate the one or more features with the likelihood of determining an appropriate personalized weather forecast.

In a preferred embodiment, the one or more features include one or more features pertaining to the user's demographics from the group comprising age, gender, ethnicity, and medical conditions or the one or more features include one or more features pertaining to the user's sensitivities or preferences from the group comprising temperature, humidity, air quality, wind speed, sunrise time, sunset time, UV index, duration of sunlight, pressure, visibility, presence of storm or natural disaster, pollen level, flu risk, tides, presence of mosquitos, rain, hail, sleet, snow, and ice.

In a preferred embodiment, the one or more features include one or more weather features from the group comprising temperature, humidity, air quality, wind speed, sunrise time, sunset time, UV index, duration of sunlight, pressure, visibility, presence of storm or natural disaster, pollen level, flu risk, tides, presence of mosquitos, quantity of rain, duration of rain, quantity of hail, duration of hail, quantity of sleet, duration of sleet, quantity of snow, duration of snow, quantity of ice, and duration of icy conditions.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which:

FIG. 3 depicts an exemplary illustration of a weather forecast that is not personalized for a user, in accordance with the exemplary embodiments.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Figure 1:
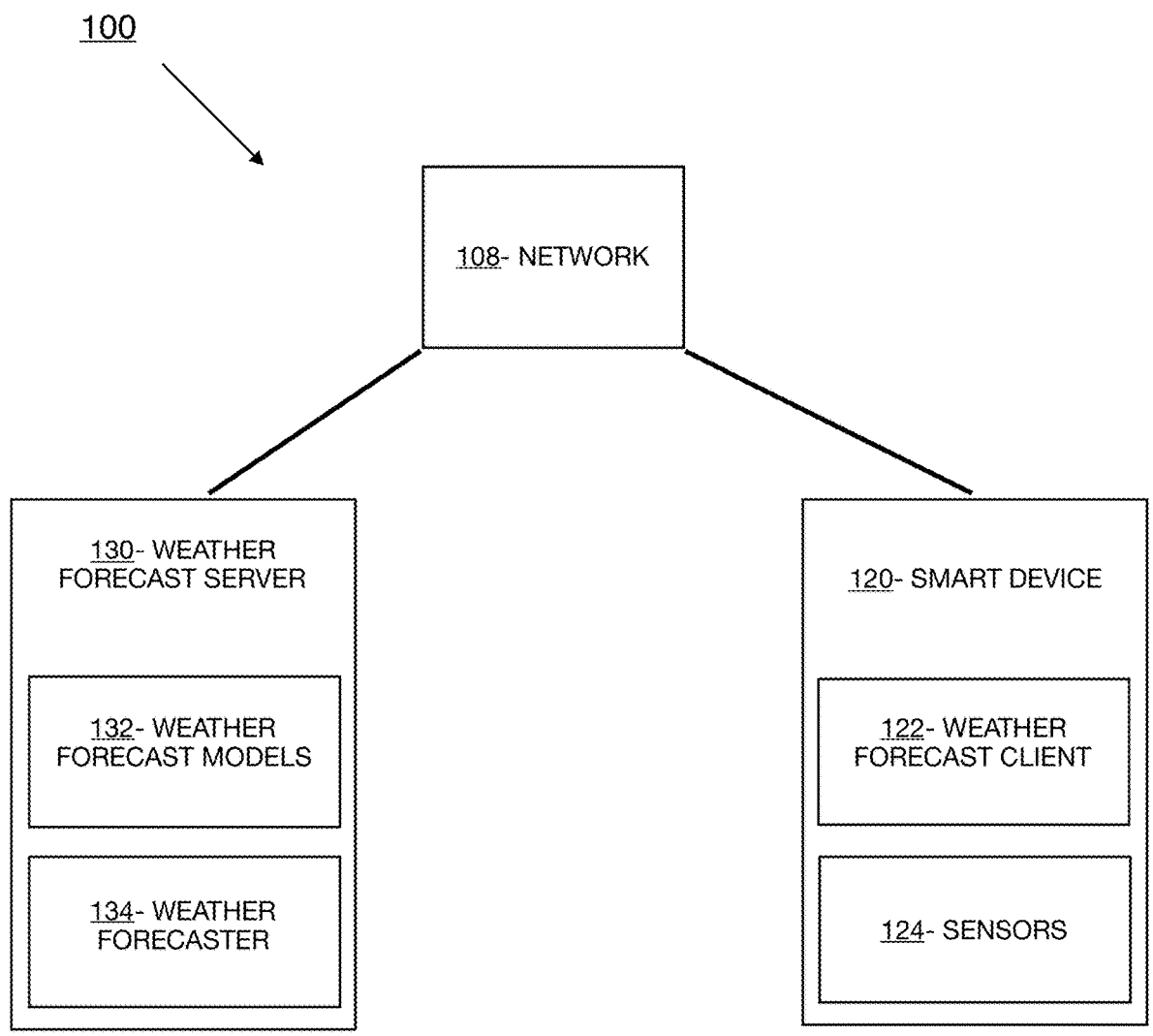
FIG. 1 depicts an exemplary schematic diagram of a weather forecast system 100, in accordance with the exemplary embodiments.

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

Many people perceive weather conditions differently. One person may view a temperature of 50 degrees Fahrenheit as warm while another person may view it as cold. Weather forecasts that are not personalized may fail to communicate weather considerations that may be important to a particular person. For example, if a person has asthma, they may be more sensitive to dust and smoke, and wish to be notified when weather conditions are not suitable for them.

Exemplary embodiments are directed to a method, computer program product, and computer system for forecasting weather. In embodiments, machine learning may be used to create models capable of determining one or more personalized weather forecasts, while feedback loops may improve upon such models. Moreover, data from user uploads, databases, the network 108, or the sensors 124 may be used to forecast weather for a user.

Many users may wish to receive personalized weather forecasting so that they are better informed of weather conditions. In embodiments, weather conditions may pertain to temperature, humidity, air quality, wind speed, sunrise time, sunset time, UV index, duration of sunlight, pressure, visibility, presence of storm or natural disaster, pollen level, flu risk, tides, presence of mosquitos, etc. forecasts as well as quantity and duration of rain, hail, sleet, snow, ice, etc. forecasts. For example, if a person has asthma, they may be more sensitive to low air quality caused by dust and smoke and wish to be notified when weather conditions are not suitable for them. In another example, a person may dislike hot and humid conditions, and wish to be notified when the temperature and humidity rise above certain thresholds. In general, it will be appreciated that embodiments described herein may relate to determining one or more personalized weather forecasts for one or more users within any environment and for any motivation.

FIG. 1 depicts the weather forecast system 100, in accordance with the exemplary embodiments. According to the exemplary embodiments, the weather forecast system 100 may include one or more sensors 124, a smart device 120, and a weather forecast server 130, which may all be interconnected via a network 108. While programming and data of the exemplary embodiments may be stored and accessed remotely across several servers via the network 108, programming and data of the exemplary embodiments may alternatively or additionally be stored locally on as few as one physical computing device or amongst other computing devices than those depicted.

In the exemplary embodiments, the network 108 may be a communication channel capable of transferring data between connected devices. Accordingly, the components of the weather forecast system 100 may represent network components or network devices interconnected via the network 108. In the exemplary embodiments, the network 108 may be the Internet, representing a worldwide collection of networks and gateways to support communications between devices connected to the Internet. Moreover, the network 108 may utilize various types of connections such as wired, wireless, fiber optic, etc. which may be implemented as an intranet network, a local area network (LAN), a wide area network (WAN), or a combination thereof. In further embodiments, the network 108 may be a Bluetooth network, a Wi-Fi network, or a combination thereof. In yet further embodiments, the network 108 may be a telecommunications network used to facilitate telephone calls between two or more parties comprising a landline network, a wireless network, a closed network, a satellite network, or a combination thereof. In general, the network 108 may represent any combination of connections and protocols that will support communications between connected devices.

In the example embodiment, the smart device 120 includes a weather forecast client 122 and one or more sensors 124, and may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an IoT device, or any other electronic device or computing system capable of receiving and sending data to and from other computing devices. While the smart device 120 is shown as a single device, in other embodiments, the smart device 120 may be comprised of a cluster or plurality of computing devices, in a modular manner, etc., working together or working independently. The smart device 120 is described in greater detail as a hardware implementation with reference to FIG. 5, as part of a cloud implementation with reference to FIG. 6, and/or as utilizing functional abstraction layers for processing with reference to FIG. 7.

The weather forecast client 122 may act as a client in a client-server relationship. The weather forecast client 122 may also be a software and/or hardware application capable of communicating with and providing a user interface for a user to interact with a server, for example the weather forecast server 130, via the network 108. Moreover, in the example embodiment, the weather forecast client 122 may be capable of transferring data from the sensors 124 between the smart device 120 and other devices via the network 108. In embodiments, the weather forecast client 122 utilizes various wired and wireless connection protocols for data transmission and exchange, including Bluetooth, 2.4 gHz and 5 gHz internet, near-field communication, Z-Wave, Zigbee, etc. The weather forecast client 122 is described in greater detail with respect to FIG. 2.

In example embodiments, the sensors 124 may comprise a camera, microphone, light sensor, infrared sensor, movement detection sensor, pressure sensor, humidity sensor, thermometer, global positioning system (GPS) sensor, or other sensory hardware equipment. Moreover, an array of the one or more sensors 124 may be incorporated such that information can be obtained by the sensors 124 in multiple directions, at different times/intervals, in different mediums/ frequencies, and the like. For example, three video cameras may be attached to the smart device 120 and may each record an adjacent sixty-degree viewing angle spanning a total of one-hundred and eighty degrees. Moreover, data processing techniques may be implemented such that directional information of visual and audio data can be obtained based on signals received by each of the sensors 124, such as trilateration and triangulation.

While the sensors 124 are depicted as integrated with the smart device 120, in embodiments, the sensors 124 may be incorporated within an environment in which the weather forecast system 100 is implemented. For example, the sensors 124 may be one or more thermometers built into a wall, a camera built into a facility, etc. Moreover, data processing techniques may be implemented such that directional information of visual and audio data can be obtained based on signals received by each of the sensors 124, such as trilateration and triangulation. In other embodiments, the sensors 124 may be integrated with other smart devices, e.g., smart phones and laptops, within an environment implementing the weather forecast system 100. In such embodiments, the sensors 124 may communicate directly with other networks and devices, such as the network 108. The sensors 124 are described in greater detail as a hardware implementation with reference to FIG. 5, as part of a cloud implementation with reference to FIG. 6, and/or as utilizing functional abstraction layers for processing with reference to FIG. 7.

In the exemplary embodiments, the weather forecast server 130 may include one or more weather forecast models 132 and a weather forecaster 134 and may act as a server in a client-server relationship with the weather forecast client 122. The weather forecast server 130 may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of receiving and sending data to and from other computing devices. While the weather forecast server 130 is shown as a single device, in other embodiments, the weather forecast server 130 may be comprised of a cluster or plurality of computing devices, working together or working independently. The weather forecast server 130 is described in greater detail as a hardware implementation with reference to FIG. 5, as part of a cloud implementation with reference to FIG. 6, and/or as utilizing functional abstraction layers for processing with reference to FIG. 7.

The weather forecast models 132 may be one or more algorithms modelling a correlation between one or more features and one or more personalized weather forecasts. In the example embodiment, the weather forecast models 132 may be generated using machine learning methods, such as neural networks, deep learning, hierarchical learning, Gaussian Mixture modelling, Hidden Markov modelling, and K-Means, K-Medoids, or Fuzzy C-Means learning, etc., and may model a likelihood of the one or more features being indicative of an accurate personalized weather forecast. In embodiments, such features may pertain to user preferences or sensitivities to temperature, humidity, air quality, wind speed, sunrise time, sunset time, UV index, duration of sunlight, pressure, visibility, presence of storm or natural disaster, pollen level, flu risk, tides, presence of mosquitos, etc. as well as quantity and duration of rain, hail, sleet, snow, ice, etc. The weather forecast models 132 may weight the features based on an effect that the features have on determining an accurate personalized weather forecast for a user. The weather forecast models 132 are described in greater detail with reference to FIG. 2.

In the exemplary embodiments, the weather forecaster 134 may be a software and/or hardware program capable of collecting training data, extracting features from the training data, and training one or more models based on the extracted features. The weather forecaster 134 may additionally be capable of configuring a session and collecting data. The weather forecaster 134 may further extract features from the collected data and apply one or more models to the extracted features to determine a personalized weather forecast for a user. Moreover, the weather forecaster 134 may be further configured for notifying a user of the personalized weather forecast, evaluating whether the weather forecast was accurate, and adjusting the one or more models based on the evaluation. The weather forecaster 134 is described in greater detail with reference to FIG. 2.

Figure 2:
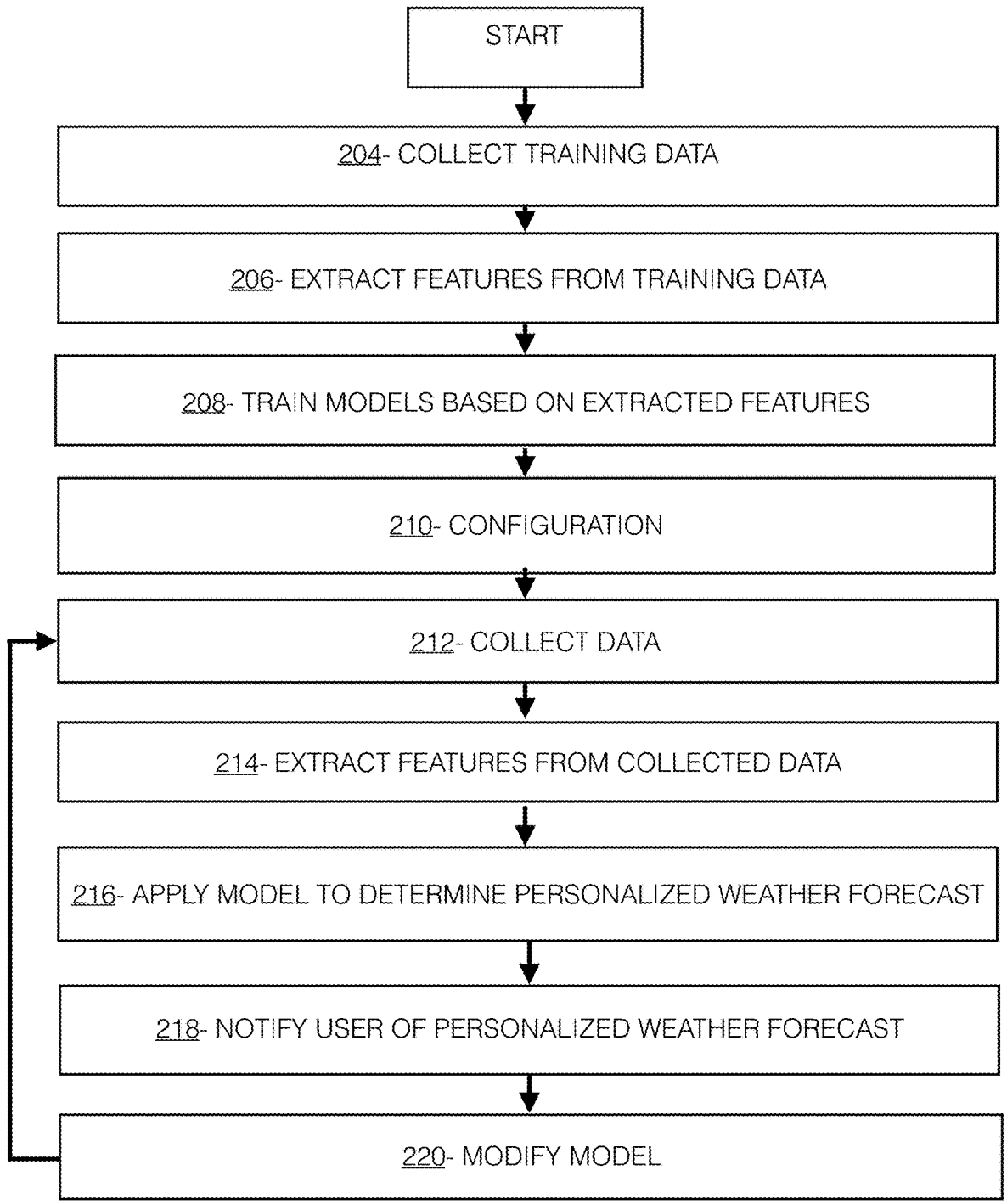
FIG. 2 depicts an exemplary flowchart illustrating the operations of a weather forecaster 134 of the weather forecast system 100 in forecasting weather, in accordance with the exemplary embodiments.

FIG. 2 depicts an exemplary flowchart illustrating the operations of a weather forecaster 134 of the weather forecast system 100 in forecasting weather, in accordance with the exemplary embodiments. In exemplary embodiments, the weather forecaster 134 first implements a training phase in which it trains the weather forecast models 132 using training data of a user's actions during various weather conditions. The weather forecaster 134 then moves on to an operational phase in which it applies the trained weather forecast models 132 to current data in order to make one or more personalized weather forecasts for the user.

The weather forecaster 134 may collect and/or receive training data (step 204). In embodiments, the training data may be sourced from one or more users' actions during various weather conditions. Training data may include data of one or more users' actions or preferences such as staying inside, turning on a heater or air conditioner, closing or opening doors or windows, wearing or removing jackets, boots, gloves, etc., turning on an air purifier, applying sunscreen, going skiing, running, etc. in response to various weather conditions (i.e., sunny and 80 degrees Fahrenheit with excellent air quality, rainy and 40 degrees Fahrenheit with wind, 6 inches of snow expected and 10 degrees Fahrenheit, etc.). In embodiments, training data may be labelled with associated user actions, locations, weather conditions, and/or user names or other information. For example, training data may include data of a sunny 80-degree Fahrenheit day and video footage of John outdoors labelled with, "User: John, Actions: Apply sunscreen, wear shorts and a hat, and spend two hours running outdoors" Alternatively, training data may include video footage data of John running outdoors labelled with "User: John, Weather: sunny 80-degree Fahrenheit day." The weather forecaster 134 may collect training data from microphones and video cameras, which may be built into the user's smart device 120. The weather forecaster 134 may retrieve training data via user upload, databases, or the sensors 124. In embodiments, the weather forecaster 134 may collect training data via the sensors 124 as one or more microphones built into a facility, an outdoor recreational area, indoor recreational area, etc. as well as one or more GPS sensors built into the smart device 120 or any other device. In embodiments, the weather forecaster 134 may collect training data of how one or more users would prefer to act in various weather conditions. For example, training data may be uploaded specifying that John would prefer to stay inside when the temperature drops below 55 degrees Fahrenheit and prefers to spend time outside when the temperature is above 75 degrees Fahrenheit. The collected training data may pertain to user health conditions (i.e., dry skin, eczema, asthma, allergies, joint aches and pains, etc.), preferences, or sensitivities to temperature, humidity, air quality, wind speed, sunrise time, sunset time, UV index, duration of sunlight, pressure, visibility, presence of storm or natural disaster, pollen level, flu risk, tides, presence of mosquitos, etc. as well as quantity and duration of rain, hail, sleet, snow, ice, etc.

To further illustrate the operations of the weather forecaster 134, reference is now made to an illustrative example where the weather forecaster 134 collects training data of various users and their actions and preferences associated with various weather conditions.

The weather forecaster 134 may extract one or more features from the collected and/or received training data (step 206). The extracted features may be extracted from the audio, video, etc. data and/or databases, and may include features pertaining to user preferences or sensitivities such as temperature, humidity, air quality, wind speed, sunrise time, sunset time, UV index, duration of sunlight, pressure, visibility, presence of storm or natural disaster, pollen level, flu risk, tides, presence of mosquitos, etc. as well as quantity and duration of rain, hail, sleet, snow, ice, etc. In embodiments, the weather forecaster 134 may use techniques such as feature extraction, natural language processing, named entity recognition, optical character recognition, image processing, video processing, audio processing, pattern/template matching, data comparison, convolutional neural networks, etc. to identify features. For example, the weather forecaster 134 may extract features such as temperature, humidity, air quality, wind speed, sunrise time, sunset time, UV index, duration of sunlight, pressure, visibility, presence of storm or natural disaster, pollen level, flu risk, tides, presence of mosquitos, etc. as well as quantity and duration of rain, hail, sleet, snow, ice, etc. of the user's location and/or other locations of interest (i.e., locations that the user frequently travels to, locations where the user's family members or friends are located, etc.) directly from the internet via network 108 or one or more databases using feature extraction, optical character recognition, named entity recognition, etc. The weather forecaster 134 may additionally or alternatively extract user actions and/or preferences in response to temperature, humidity, air quality, wind speed, sunrise time, sunset time, UV index, duration of sunlight, pressure, visibility, presence of storm or natural disaster, pollen level, flu risk, tides, presence of mosquitos, etc. as well as quantity and duration of rain, hail, sleet, snow, ice, etc. directly from one or more sensors 124 (i.e., video cameras, microphones, thermometers, barometers, light sensors, infrared sensor, movement detection sensor, humidity sensor, global positioning system (GPS) sensor, etc.) using image processing, video processing, audio processing, pattern/template matching, data comparison, etc. For example, the weather forecaster 134 may extract a user's sensitivity to UV index from video footage of the user applying sunscreen. In another example, the weather forecaster 134 may extract a user's preference to bring an umbrella outdoors in response to a high quantity and long duration of rainfall from collected video footage. In an additional example, the weather forecaster 134 may extract a user's preference to go skiing in response to a projected high quantity of snowfall from video footage. In embodiments, the weather forecaster 134 may extract preferences or sensitivities of a person other than the user who shares similar demographics such as age, gender, ethnicity, medical conditions, etc. with the user. The weather forecaster 134 may later associate extracted weather conditions with extracted user actions and/or preferences.

With reference to the previously introduced example where the weather forecaster 134 collects training data of various users and their actions and preferences associated with various weather conditions, the weather forecaster 134 extracts features temperature, humidity, air quality, wind speed, sunrise time, sunset time, UV index, duration of sunlight, pressure, visibility, presence of storm or natural disaster, pollen level, flu risk, tides, presence of mosquitos, etc. as well as quantity and duration of rain, hail, sleet, snow, ice, etc. from the collected training data with respect to the various users and their actions and preferences.

The weather forecaster 134 may train one or more weather forecast models 132 based on the extracted features (step 208). The weather forecaster 134 may train one or more weather forecast models 132 based on an association of the one or more extracted features with one or more extracted or labelled user actions and/or preferences. As previously mentioned, such extracted features may include features pertaining to weather such as temperature, humidity, air quality, wind speed, sunrise time, sunset time, UV index, duration of sunlight, pressure, visibility, presence of storm or natural disaster, pollen level, flu risk, tides, presence of mosquitos, etc. as well as quantity and duration of rain, hail, sleet, snow, ice, etc. In embodiments, such features may additionally pertain to user actions or preferences with respect to temperature, humidity, air quality, wind speed, sunrise time, sunset time, UV index, duration of sunlight, pressure, visibility, presence of storm or natural disaster, pollen level, flu risk, tides, presence of mosquitos, etc. as well as quantity and duration of rain, hail, sleet, snow, ice, etc. The one or more weather forecast models 132 may be generated through machine learning techniques such as neural networks, and the weather forecaster 134 may train the one or more weather forecast models 132 to weight the features such that features shown to have a greater correlation with determining a personalized weather forecast are weighted greater than those features that are not. In embodiments, the weather forecast models 132 may include a model for each user. Based on the weather forecast models 132's extracted features and weights associated with such extracted features, the weather forecaster 134 may later determine a personalized weather forecast for one or more users.

With reference to the previously introduced example where the weather forecaster 134 extracts features from the collected training data with respect to various users and their actions and preferences, the weather forecaster 134 trains a model for each user of the collected training data.

The weather forecaster 134 may receive a configuration (step 210). Having trained the one or more weather forecast models 132, the weather forecaster 134 may now apply the one or more weather forecast models 132 to determine one or more personalized weather forecasts in real time. The weather forecaster 134 may first, however, receive a user configuration by receiving a user registration and user preferences. The user registration may be uploaded by a user, i.e., a person using the weather forecast system 100 or administrator, i.e., a person overseeing the usage of the weather forecast system 100 (such as a parent or guardian of the user, employer of the user, etc.) and the configuration may be received by the weather forecaster 134 via the weather forecast client 122 and the network 108. Receiving the user registration may involve referencing a user profile via user login credentials, internet protocol (IP) address, media access control (MAC) address, etc., or receiving user input information such as a name, date of birth, gender, address/geographic information, phone number, email address, company name, device serial numbers, one or more smart device 120 types, sensors 124 types, and the like. Receiving a user registration may also involve receiving or extracting data from databases such as user calendar data, social media data, health data, medical records, etc. Lastly, the weather forecaster 134 may receive a configuration of the one or more sensors 124, whether they be fixed to one or more devices (e.g., the smart device 120) or fixed within an environment in which the weather forecast system 100 is implemented (e.g., fixed above a doorway, fixed in a recreational area, etc.).

During configuration, the weather forecaster 134 may further receive user preferences (step 210 continued). User preferences may include preferences for the timing or frequency of notification to the user of one or more personalized weather forecasts. For example, user preferences may specify that the weather forecaster 134 is to notify a user of weather changes that would alter a user's actions. In another example, user preferences may specify that the weather forecaster 134 is to notify a user of a weather forecast only if the weather is a health concern (i.e., poor air quality, high UV index, etc.). In another example, user preferences may specify that the weather forecaster 134 not notify a user of weather forecasts at all.

With reference to the previously introduced example where the weather forecaster 134 trains a model for each user of the collected training data, the weather forecaster 134 receives a user registration via user upload including the user's name, type of smart device 120, types of sensors 124 including a microphone and video camera, and links to databases containing user calendar data, medical data, and weather preference data. The weather forecaster 134 also receives user preferences via user upload specifying that the user is to be notified with a personalized weather forecast for each day once daily at 8 am EST and additionally whenever weather conditions pose health concerns to the user via visual feedback on their smart device 120.

The weather forecaster 134 may collect data (step 212). In embodiments, the weather forecaster 134 may collect data of the user such as user calendar data, social media data, health data, medical data, weather sensitivities or preferences, etc. from one or more databases uploaded during configuration. In embodiments, the weather forecaster 134 may additionally collect data of the user, the user's actions or preferences, and/or the weather from one or more sensors 124, which may include one or more microphones or video cameras built into the smart device 120, mounted to a wall of a facility incorporating the weather forecast system 100, etc. The collected data may relate to the weather and the user's actions, preferences or sensitivities to temperature, humidity, air quality, wind speed, sunrise time, sunset time, UV index, duration of sunlight, pressure, visibility, presence of storm or natural disaster, pollen level, flu risk, tides, presence of mosquitos, etc. as well as quantity and duration of rain, hail, sleet, snow, ice, etc.

With reference to the previously introduced example where the weather forecaster 134 receives a user registration and user preferences, the weather forecaster 134 collects calendar, medical, and weather preferences data of the user from the databases uploaded during configuration. The weather forecaster 134 additionally collects data of the weather and the user's actions.

The weather forecaster 134 may extract one or more features from the collected and/or received data (step 214). The weather forecaster 134 may extract one or more features from the collected and/or received data in the same manner as described with reference to step 206, however here the features are extracted not from the training data, but rather from the currently collected data.

With reference to the previously introduced example where the weather forecaster 134 collects data of the weather and the user's actions, the weather forecaster 134 extracts the below weather features in Table 1 and user preference features in Table 2 from the collected data.

TABLE 1

| Extracted Weather Features | |
| --- | --- |
| temperature | 70 degrees Fahrenheit |
| humidity | 42% |
| air quality | 36 AQI |
| wind speed | 2 mph |
| sunrise time | 6:01 am |
| sunset time | 7:24 pm |
| UV index | 5 of 10 |
| sunlight duration | 8 hours, 23 minutes |
| pressure | 30 inHg |
| visibility | 10 miles |
| presence of storm or natural disaster | none |
| precipitation | none |

TABLE 2

| Extracted User Preference Features | |
| --- | --- |
| temperature | >65 degrees Fahrenheit is too hot |
| humidity | >35% humidity is too humid |
| air quality | >60 AQI is too poor |
| wind speed | >10 mph is too fast |
| UV index | 3-7 acceptable range |
| visibility | <2 miles is too poor |

Figure 4:
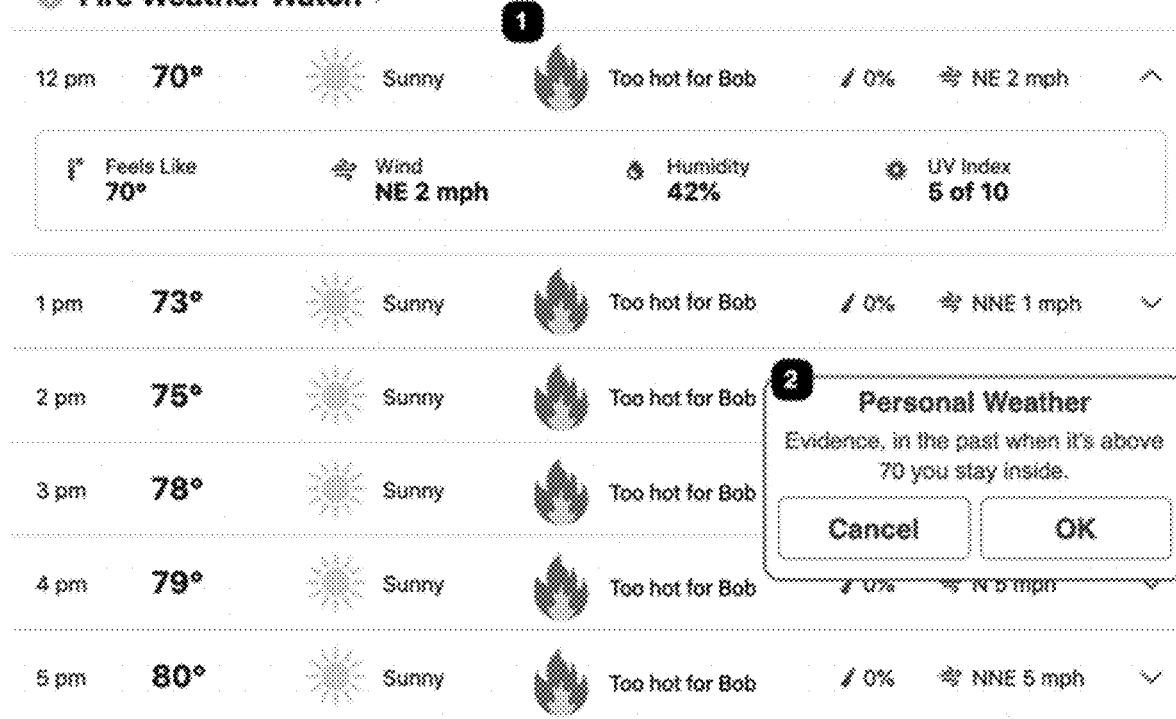
FIG. 4 depicts an exemplary illustration of a weather forecast that is personalized for a user, in accordance with the exemplary embodiments.

The weather forecaster 134 may apply one or more models to the extracted features to determine one or more personalized weather forecasts (step 216). As previously mentioned, such extracted features may relate to the weather and the user's preferences or sensitivities to temperature, humidity, air quality, wind speed, sunrise time, sunset time, UV index, duration of sunlight, pressure, visibility, presence of storm or natural disaster, pollen level, flu risk, tides, presence of mosquitos, etc. as well as quantity and duration of rain, hail, sleet, snow, ice, etc. The one or more weather forecast models 132 may be generated through machine learning techniques such as neural networks. In embodiments, the one or more weather forecast models 132 may be trained at initialization and/or through the use of a feedback loop to weight the features such that features shown to have a greater correlation with determining an appropriate personalized weather forecast are weighted greater than those features that are not. Based on the extracted features and weights associated with such extracted features, the weather forecaster 134 may determine one or more personalized weather forecasts, such as "too hot for user," "too cold for user," "don't forget to apply sunscreen," "don't forget an umbrella," "don't forget your winter jacket," "stay inside due to low air quality," "consider skiing to enjoy the snowfall," "consider surfing due to rising tides," etc. With reference to FIG. 4, applying one or more models to the extracted features may determine one or more personalized weather forecasts for the user.

With reference to the previously introduced example where the weather forecaster 134 extracts features from the collected data, the weather forecaster 134 applies the previously trained model for the user to determine the personalized weather recommendation: "Too hot for Bob. In the past, when it's above 70 degrees Fahrenheit you stay inside."

Upon determining one or more appropriate personalized weather forecasts, the weather forecaster 134 may notify one or more users of the one or more personalized weather forecasts (step 218). In embodiments, the weather forecaster 134 may notify the user and/or the administrator of the determined weather forecasts. The weather forecaster 134 may convey the one or more recommendations to the user and/or administrator in the form of audio, video, text, or any other manner via the smart device 120 and/or any other device. The weather forecaster 134 may await feedback from the user and/or administrator indicative of whether one or more of the recommendations are appropriate. As discussed with reference to configuration, the weather forecaster 134 may notify the user and/or administrator of one or more recommendations according to the user preferences of configuration (i.e., once hourly, once daily, and/or when severe weather changes occur). In embodiments, the weather forecaster 134 may be configured for receiving user and/or administrator input acknowledging, dismissing, and/or affirming that one or more personalized weather forecasts are appropriate and/or helpful. With reference to FIG. 4, the user may be notified with the determined personalized weather forecast.

With reference to the previously introduced example where the weather forecaster 134 recommends, "Too hot for Bob. In the past, when it's above 70 degrees Fahrenheit you stay inside" and additionally with reference to FIG. 4, the weather forecaster 134 notifies the user of the personalized weather forecast on their smart device via visual feedback according to the user preferences.

The weather forecaster 134 may evaluate and modify the weather forecast models 132 (step 220). In the example embodiment, the weather forecaster 134 may verify whether the one or more personalized weather forecasts were appropriate and/or helpful in order to provide a feedback loop for modifying the weather forecast models 132. In embodiments, the feedback loop may simply provide a means for the user and/or administrator to indicate whether the one or more personalized weather forecasts were appropriate and/or helpful to the user. The feedback loop indication may be triggered via a toggle switch, button, slider, etc. that may be selected by the user and/or administrator manually by hand using a button/touchscreen/etc., by voice, and the like. Based on the weather forecaster 134 appropriately or inappropriately making one or more personalized weather forecasts, the weather forecaster 134 may modify the weather forecast models 132. In other embodiments, the weather forecaster 134 may infer or deduce whether the recommendation was helpful to the user. For example, the weather forecaster 134 may interpret user dialogue via natural language processing to determine whether the reply was helpful to the user. For example, if the user says, "That doesn't seem right" or other expressions indicative of a user's dissatisfaction, the weather forecaster 134 may infer that the recommendation was inappropriate and modify the weather forecast models 132 accordingly. In another example, if the weather forecaster 134 collects video footage of a user ignoring a recommendation (i.e., if recommendation is to put on winter coat, but user does not put on winter coat before leaving their house), the weather forecaster 134 may infer that the recommendation was inappropriate and modify the weather forecast models 132 accordingly. Based on feedback received in the above or any other manners, the weather forecaster 134 may then modify the weather forecast models 132 to more accurately make personalized weather forecasts.

With reference to the previously introduced example where the weather forecaster 134 notifies the user: "Too hot for Bob. In the past, when it's above 70 degrees Fahrenheit you stay inside" on their smart device via visual feedback according to the user preferences, the user says, "Thank you, I'll stay inside today" and the weather forecaster 134 modifies the weather forecast models 132 accordingly.

FIG. 3 depicts an exemplary illustration of a weather forecast that is not personalized for a user, in accordance with the exemplary embodiments.

FIG. 4 depicts an exemplary illustration of a weather forecast that is personalized for a user, in accordance with the exemplary embodiments.

Figure 5:
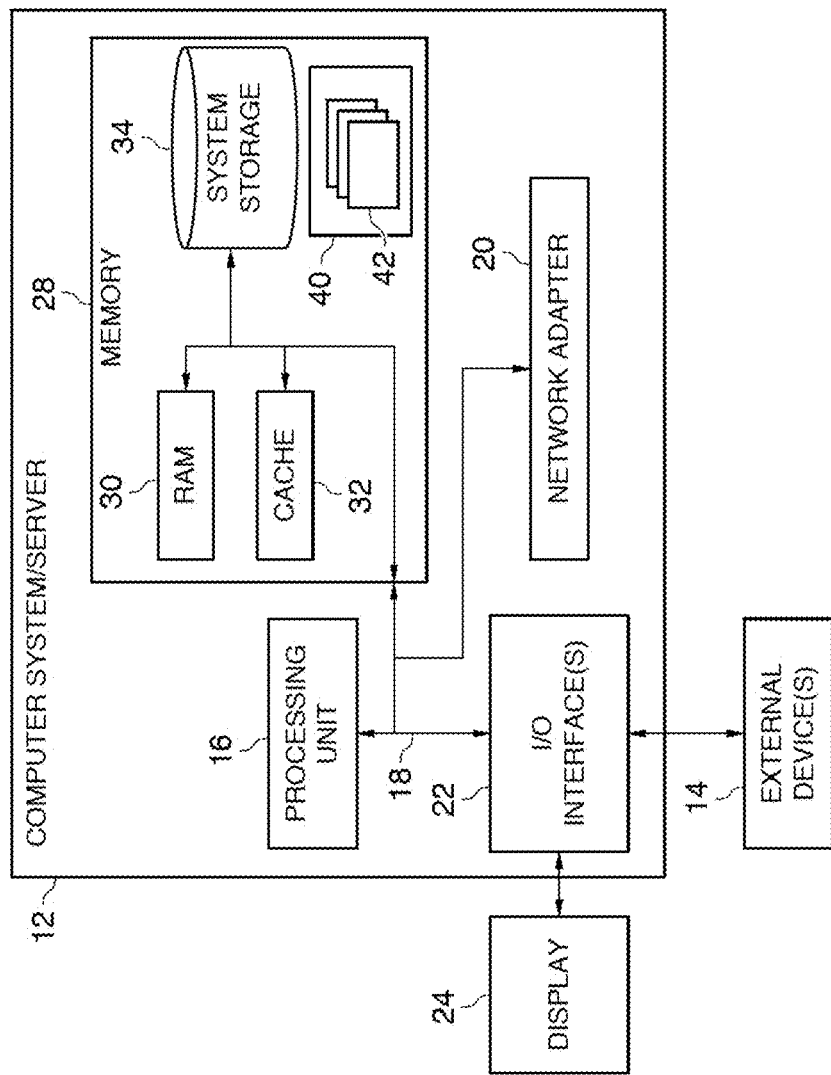
FIG. 5 depicts an exemplary block diagram depicting the hardware components of the weather forecast system 100 of FIG. 1, in accordance with the exemplary embodiments.

FIG. 5 depicts a block diagram of devices within the weather forecast system 100 of FIG. 1, in accordance with the exemplary embodiments. It should be appreciated that FIG. 5 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments. Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
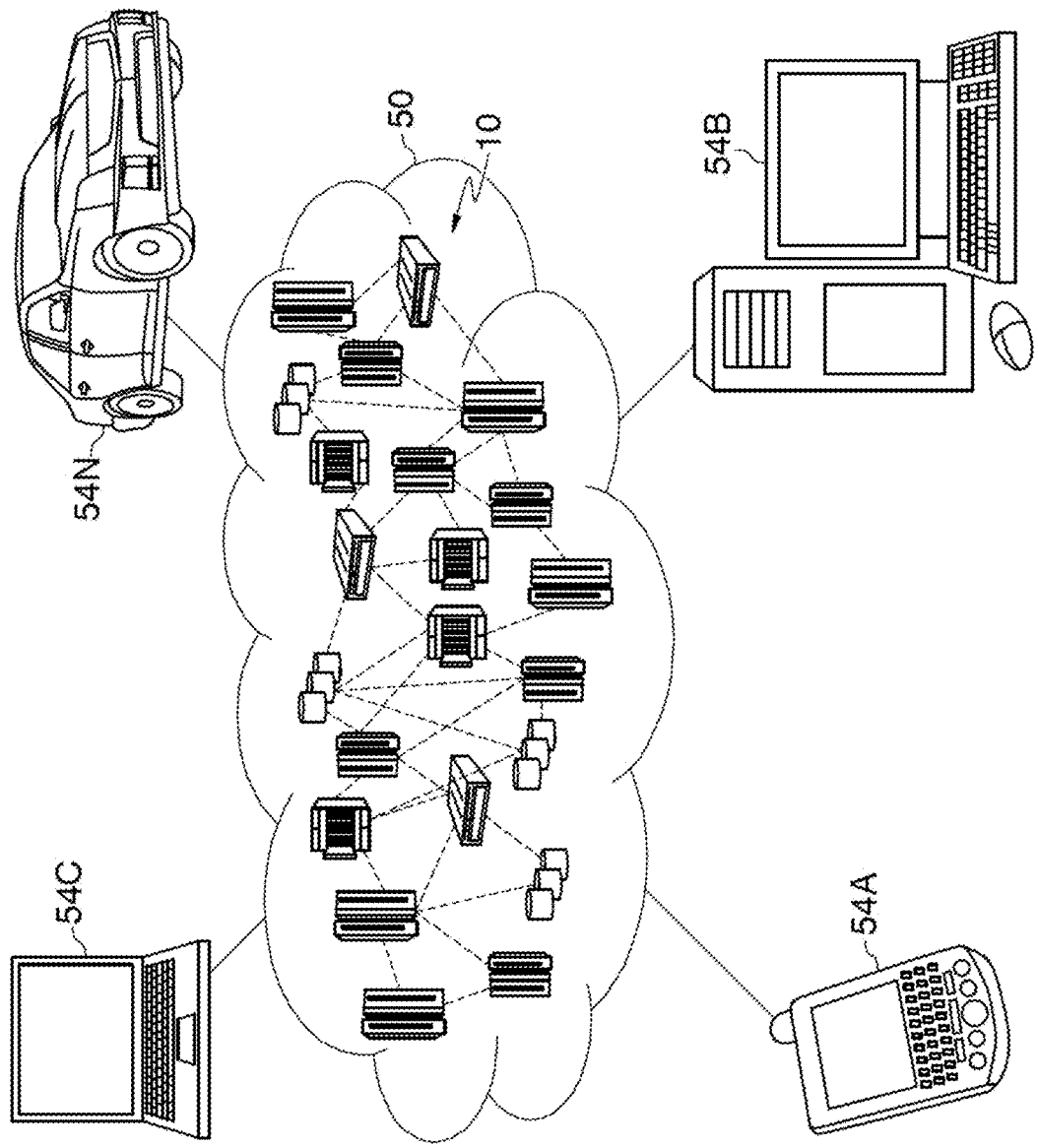
FIG. 6 depicts a cloud computing environment, in accordance with the exemplary embodiments.

Referring now to FIG. 6, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 40 and cloud computing environment 50 can communicate with any type of computerized device over any type of network and/or network addressable connection (e.g., using a web browser).

Figure 7:
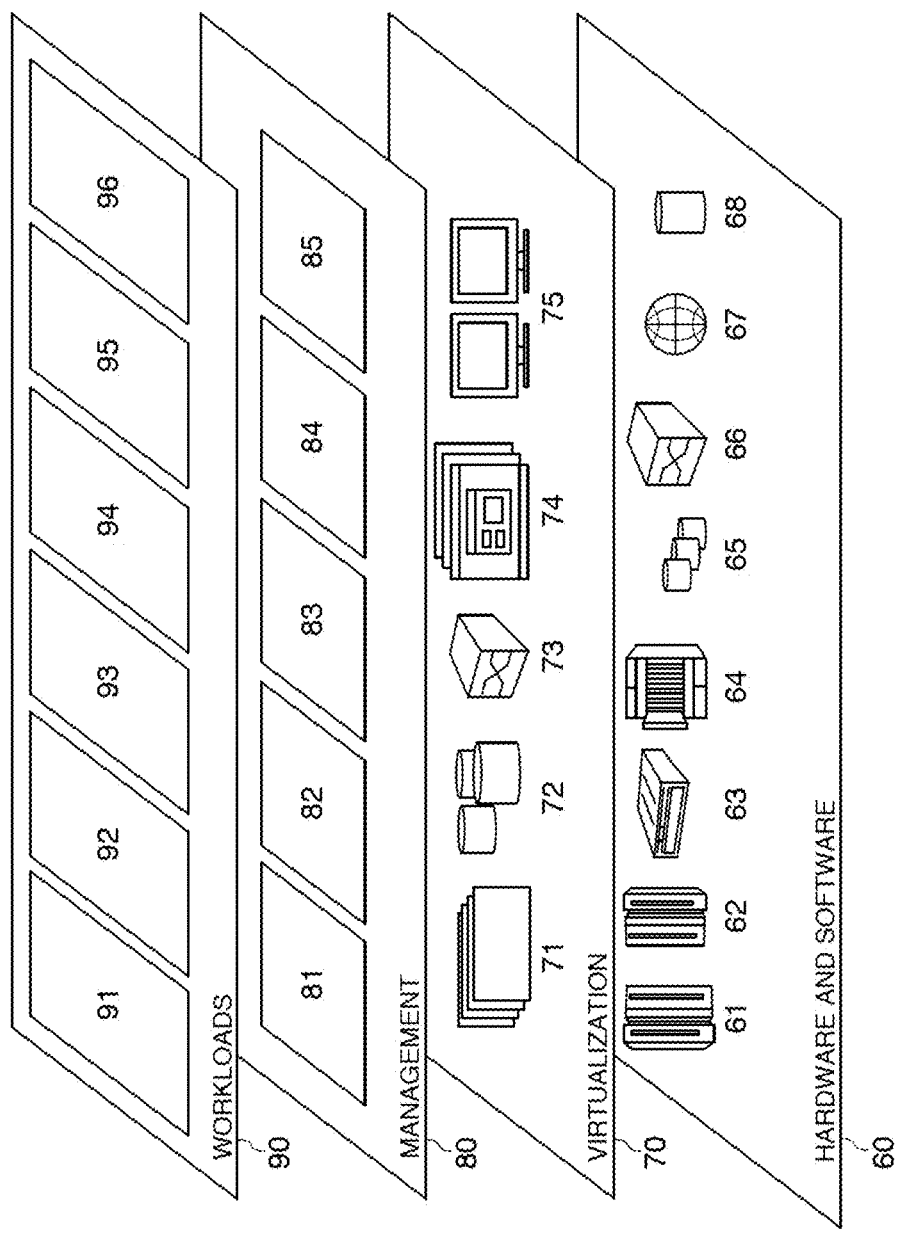
FIG. 7 depicts abstraction model layers, in accordance with the exemplary embodiments.

Referring now to FIG. 7, a set of functional abstraction layers provided by cloud computing environment 50 (FIG. 6) is shown. It should be understood in advance that the components, layers, and functions shown in FIG. 7 are intended to be illustrative only and the exemplary embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and personalized weather forecasting 96.

The exemplary embodiments may be a system, a method, and/or a computer program product at any possible technical detail level of integration. The computer program product may include a computer readable storage medium (or media) having computer readable program instructions thereon for causing a processor to carry out aspects of the exemplary embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the exemplary embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the exemplary embodiments.

Aspects of the exemplary embodiments are described herein with reference to flowchart illustrations and/or block diagrams of methods, apparatus (systems), and computer program products according to the exemplary embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various exemplary embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for determining a personalized weather forecast using a machine learning model, the method comprising:
   training a machine learning model to be specific to a user, wherein the machine learning model is trained based on (i) an interest of the specific user and (ii) one or more sensitivities associated with the specific user, wherein training the machine learning model comprises:
   detecting one or more user actions associated with the interest of the specific user, the one or more sensitivities, and different weather conditions using one or more computing devices, wherein the one or more computing devices are configured to detect the one or more user actions associated with the interest of the specific user, the one or more sensitives, and the different weather conditions using sensors including global positioning satellite (GPS) sensors, cameras, or microphones, wherein the one or more sensitivities comprise health-related sensitivities of the specific user that are affected by the different weather conditions, the health-related sensitivities corresponding to flu risk and at least one of: dry skin, eczema, or chronic pains,
   correlating the one or more user actions associated with the interest and the one or more sensitivities with the different weather conditions, the user location data, and user information by labeling the received and captured data with (i) the user information, (ii) the one or more user actions associated with the interest, (iii) the one or more sensitivities, (iv) the user location data, and (v) one or more of the different weather conditions, the labeled data indicating (a) preferred weather conditions for performing the one or more user actions associated with the interest and (b) other weather conditions that cause the one or more sensitivities to worsen for the specific user,
   generating and storing training data for the specific user that comprises the labeled data,
   training the machine learning model for the specific user based on providing the training data as training input to the machine learning model for the specific user, wherein training the machine learning model for the specific user comprises training the machine learning model for the specific user to:
     (i) identify the one or more sensitivities that are likely to affect the specific user upon detection of the different weather conditions,
     (ii) generate a personalized weather forecast for the specific user based on the identified one or more sensitivities and in response to detecting the corresponding different weather conditions, and
     (iii) weight one or more features associated with the corresponding different weather conditions such that the one or more features having a greater correlation with generating the personalized weather forecast are weighted greater than other features having a lesser correlation with generating the personalized weather forecast;
   in response to receiving real-time weather conditions data associated with a designated location of the specific user,
   generating, based on applying the trained machine learning model for the specific user to the real-time weather conditions data, a personalized weather forecast of the designated location for the specific user, wherein the personalized weather forecast comprises a subset of features associated with the real-time weather conditions data that are weighted, by the trained machine learning model for the specific user, to have a greatest correlation with the interest and at least one of the one or more sensitivities of the specific user;
   generating recommendations for the specific user based on the interest, the subset of features associated with the real-time weather conditions, and the at least one of the one or more sensitivities;

returning the personalized weather forecast and the recommendations to a computing device of the specific user;

capturing user activity data in response to returning the personalized weather forecast and the recommendations; and modifying the trained machine learning model for the specific user based on the captured user activity data, wherein the user activity data indicates responses of the specific user to the personalized weather forecast and the recommendations.

2. The method of claim 1, wherein returning the personalized weather forecast and the recommendations comprises:

notifying the specific user at the computing device of the personalized weather forecast for the specific user.

3. The method of claim 1, wherein the captured user activity data comprises:

feedback provided by the specific user as input at the computing device indicating whether the personalized weather forecast is helpful to the specific user.

4. The method of claim 1, wherein the machine learning model for the specific user was further trained to correlate the one or more features associated with the corresponding different weather conditions with a likelihood of using the one or more features for generating the personalized weather forecast.

5. The method of claim 1, wherein:

the one or more features associated with the corresponding different weather conditions pertain to the one or more sensitivities from the group comprising: temperature, humidity, air quality, wind speed, sunrise time, sunset time, UV index, duration of sunlight, pressure, visibility, presence of storm or natural disaster, pollen level, tides, presence of mosquitos, rain, hail, sleet, snow, and ice.

6. The method of claim 1, wherein:

the one or more features associated with the corresponding different weather conditions include one or more weather features from the group comprising: temperature, humidity, air quality, wind speed, sunrise time, sunset time, UV index, duration of sunlight, pressure, visibility, presence of storm or natural disaster, pollen level, tides, presence of mosquitos, quantity of rain, duration of rain, quantity of hail, duration of hail, quantity of sleet, duration of sleet, quantity of snow, duration of snow, quantity of ice, and duration of icy conditions.

7. The computer-implemented method of claim 1, wherein the sensors comprise movement detection sensors that generate movement data, wherein detecting the one or more user actions, the one or more sensitivities, and the different weather conditions is further based on the movement data.

8. The computer-implemented method of claim 1, wherein the sensors comprise pressure sensors that generate pressure data, wherein detecting the one or more user actions, the one or more sensitivities, and the different weather conditions is further based on the pressure data.

9. The computer-implemented method of claim 1, wherein the sensors comprise a movement detection sensor and a pressure sensor, wherein the movement detection sensor is configured to generate movement data, wherein the pressure sensor is configured to generate pressure data, and wherein detecting the one or more user actions, the one or more sensitivities, and the different weather conditions is further based on a combination of the movement data and the pressure data.

10. A computer program product for determining a personalized weather forecast using a machine learning model, the computer program product comprising:

one or more non-transitory computer-readable storage media and program instructions stored on the one or more non-transitory computer-readable storage media capable of performing a method, the method comprising:

training a machine learning model to be specific to a user, wherein the machine learning model is trained based on (i) an interest of the specific user and (ii) one or more sensitivities associated with the specific user, wherein training the machine learning model comprises:

detecting one or more user actions associated with the interest of the specific user, the one or more sensitivities, and different weather conditions using one or more computing devices, wherein the one or more computing devices are configured to detect the one or more user actions associated with the interest of the specific user, the one or more sensitives, and the different weather conditions using sensors including global positioning satellite (GPS) sensors, cameras, or microphones, wherein the one or more sensitivities comprise health-related sensitivities of the specific user that are affected by the different weather conditions, the health-related sensitivities corresponding to flu risk and at least one of: dry skin, eczema, or chronic pains, correlating the one or more user actions associated with the interest and the one or more sensitivities with the different weather conditions, the user location data, and user information by labeling the received and captured data with (i) the user information, (ii) the one or more user actions associated with the interest, (iii) the one or more sensitivities, (iv) the user location data, and (v) one or more of the different weather conditions, the labeled data indicating (a) preferred weather conditions for performing the one or more user actions associated with the interest and (b) other weather conditions that cause the one or more sensitivities to worsen for the specific user, generating and storing training data for the specific user that comprises the labeled data, training the machine learning model for the specific user based on providing the training data as training input to the machine learning model for the specific user, wherein training the machine learning model for the specific user comprises training the machine learning model for the specific user to;

(i) identify the one or more sensitivities that are likely to affect the specific user upon detection of the different weather conditions, (ii) generate a personalized weather forecast for the specific user based on the identified one or more sensitivities and in response to detecting the corresponding different weather conditions, and (iii) weight one or more features associated with the corresponding different weather conditions such that the one or more features having a greater correlation with generating the personalized weather forecast are weighted greater than other features having a lesser correlation with generating the personalized weather forecast;

in response to receiving real-time weather conditions data associated with a designated location of the specific user, generating, based on applying the trained machine learning model for the specific user to the real-time weather conditions data, a personalized weather forecast of the designated location for the specific user, wherein the personalized weather forecast comprises a subset of features associated with the real-time weather conditions data that are weighted, by the trained machine learning model for the specific user, to have a greatest correlation with the interest and at least one of the one or more sensitivities of the specific user generating recommendations for the specific user based on the interest, the subset of features associated with the real-time weather conditions, and the at least one of the one or more sensitivities;

returning the personalized weather forecast and the recommendations to a computing device of the specific user;

capturing user activity data in response to returning the personalized weather forecast and the recommendations; and modifying the trained machine learning model for the specific user based on the captured user activity data, wherein the user activity data indicates responses of the specific user to the personalized weather forecast and the recommendations.

11. The computer program product of claim 10, wherein returning the personalized weather forecast and the recommendations comprises:

notifying the specific user at the computing device of the personalized weather forecast for the specific_user.

12. The computer program product of claim 10, wherein the captured user activity data comprises:

feedback provided by the specific user as input at the computing device indicating whether the personalized weather forecast is helpful to the specific user.

13. The computer program product of claim 10, wherein the machine learning model for the specific user was further trained to correlate the one or more features associated with the corresponding different weather conditions with a likelihood of using the one or more features for generating the personalized weather forecast.

14. The computer program product of claim 10, wherein:

the one or more features associated with the corresponding different weather conditions pertain to the one or more sensitivities from the group comprising: temperature, humidity, air quality, wind speed, sunrise time, sunset time, UV index, duration of sunlight, pressure, visibility, presence of storm or natural disaster, pollen level, tides, presence of mosquitos, rain, hail, sleet, snow, and ice.

15. The computer program product of claim 10, wherein:

the one or more features associated with the corresponding different weather conditions include one or more weather features from the group comprising: temperature, humidity, air quality, wind speed, sunrise time, sunset time, UV index, duration of sunlight, pressure, visibility, presence of storm or natural disaster, pollen level, tides, presence of mosquitos, quantity of rain, duration of rain, quantity of hail, duration of hail, quantity of sleet, duration of sleet, quantity of snow, duration of snow, quantity of ice, and duration of icy conditions.

16. A computer system for determining a personalized weather forecast using a machine learning model, the computer system comprising:

one or more computer processors, one or more computer-readable storage media, and program instructions stored on the one or more of the computer-readable storage media for execution by at least one of the one or more processors capable of performing a method, the method comprising:

training a machine learning model to be specific to a user, wherein the machine learning model is trained based on (i) an interest of the specific user and (ii) one or more sensitivities associated with the specific user, wherein training the machine learning model comprises:

detecting one or more user actions associated with the interest of the specific user, the one or more sensitivities, and different weather conditions using one or more computing devices, wherein the one or more computing devices are configured to detect the one or more user actions associated with the interest of the specific user, the one or more sensitives, and the different weather conditions using sensors including global positioning satellite (GPS) sensors, cameras, or microphones, wherein the one or more sensitivities comprise health-related sensitivities of the specific user that are affected by the different weather conditions, the health-related sensitivities corresponding to flu risk and at least one of: dry skin, eczema, or chronic pains, correlating the one or more user actions associated with the interest and the one or more sensitivities with the different weather conditions, the user location data, and user information by labeling the received and captured data with (i) the user information, (ii) the one or more user actions associated with the interest, (iii) the one or more sensitivities, (iv) the user location data, and (v) one or more of the different weather conditions, the labeled data indicating (a) preferred weather conditions for performing the one or more user actions associated with the interest and (b) other weather conditions that cause the one or more sensitivities to worsen for the specific user, generating and storing training data for the specific user that comprises the labeled data, training the machine learning model for the specific user based on providing the training data as training input to the machine learning model for the specific user, wherein training the machine learning model for the specific user comprises training the machine learning model for the specific user to:
 (i) identify the one or more sensitivities that are likely to affect the specific user upon detection of the different weather conditions,
 (ii) generate a personalized weather forecast for the specific user based on the identified one or more sensitivities and in response to detecting the corresponding different weather conditions, and
 (iii) weight one or more features associated with the corresponding different weather conditions such that the one or more features having a greater correlation with generating the personalized weather forecast are weighted greater than other features having a lesser correlation with generating the personalized weather forecast;

in response to receiving real-time weather conditions data associated with a designated location of the specific user, generating, based on applying the trained machine learning model for the specific user to the real-time weather conditions data, a personalized weather forecast of the designated location for the specific user, wherein the personalized weather forecast comprises a subset of features associated with the real-time weather conditions data that are weighted, by the trained machine learning model for the specific user, to have a greatest correlation with the interest and at least one of the one or more sensitivities of the specific user generating recommendations for the specific user based on the interest, the subset of features associated with the real-time weather conditions, and the at least one of the one or more sensitivities;

capturing user activity data in response to returning the personalized weather forecast and the recommendations; and modifying the trained machine learning model for the specific user based on the captured user activity data, wherein the user activity data indicates responses of the specific user to the personalized weather forecast and the recommendations.

17. The computer system of claim 16, wherein returning the personalized weather forecast and the recommendations comprises:

notifying the specific user at the computing device of the personalized weather forecast for the specific user.

18. The computer system of claim 16, wherein the captured user activity data comprises:

feedback provided by the specific user as input at the computing device indicating whether the personalized weather forecast is helpful to the specific user.

19. The computer system of claim 16, wherein the machine learning model for the specific user was further trained to correlate the one or more features associated with the corresponding different weather conditions with a likelihood of using the one or more features for generating the personalized weather forecast.

20. The computer system of claim 16, wherein:

the one or more features associated with the corresponding different weather conditions pertain to the one or more sensitivities from the group comprising: temperature, humidity, air quality, wind speed, sunrise time, sunset time, UV index, duration of sunlight, pressure, visibility, presence of storm or natural disaster, pollen level, tides, presence of mosquitos, rain, hail, sleet, snow, and ice.

* * * * *